United States Patent [19]

Fisher

[11] 4,224,521
[45] Sep. 23, 1980

[54] MICROPHONICS ELIMINATION CIRCUIT

[75] Inventor: Forest F. R. Fisher, Newport Beach, Calif.

[73] Assignee: Ford Aerospace & Communications Corp., Dearborn, Mich.

[21] Appl. No.: 950,334

[22] Filed: Oct. 11, 1978

[51] Int. Cl.³ .............................................. G01J 1/00
[52] U.S. Cl. ................................... 250/340; 250/338
[58] Field of Search ............... 250/349, 338, 332, 340; 328/165, 162; 307/358; 250/334

[56] References Cited

U.S. PATENT DOCUMENTS

| | | | |
|---|---|---|---|
| 3,398,285 | 8/1968 | Sachs | 250/347 |
| 3,453,432 | 7/1969 | McHenry | 250/338 |
| 3,531,802 | 9/1970 | Brown et al. | 328/165 |
| 3,732,420 | 5/1973 | Brunnett | 250/252 |
| 3,787,668 | 1/1974 | Currie et al. | 250/338 |
| 3,806,729 | 4/1974 | Caywood | 250/342 |
| 3,916,325 | 10/1975 | Lund | 307/358 |
| 4,039,883 | 8/1977 | Thom | 250/332 |
| 4,060,729 | 11/1977 | Byer et al. | 250/338 |

Primary Examiner—Alfred E. Smith
Assistant Examiner—Carolyn E. Fields
Attorney, Agent, or Firm—Paul K. Godwin, Jr.; Clifford L. Sadler

[57] ABSTRACT

The effects of microphonic noise on the output of an array of commonly-mounted pyroelectric detectors are suppressed by contemporaneously adding the signal outputs from all of the detectors, determining the averaged signal, and separately subtracting the averaged signal from each detector output. The method cancels microphonic noise and reduces random noise with only a slight decrease in the signal-to-noise ratio.

2 Claims, 1 Drawing Figure

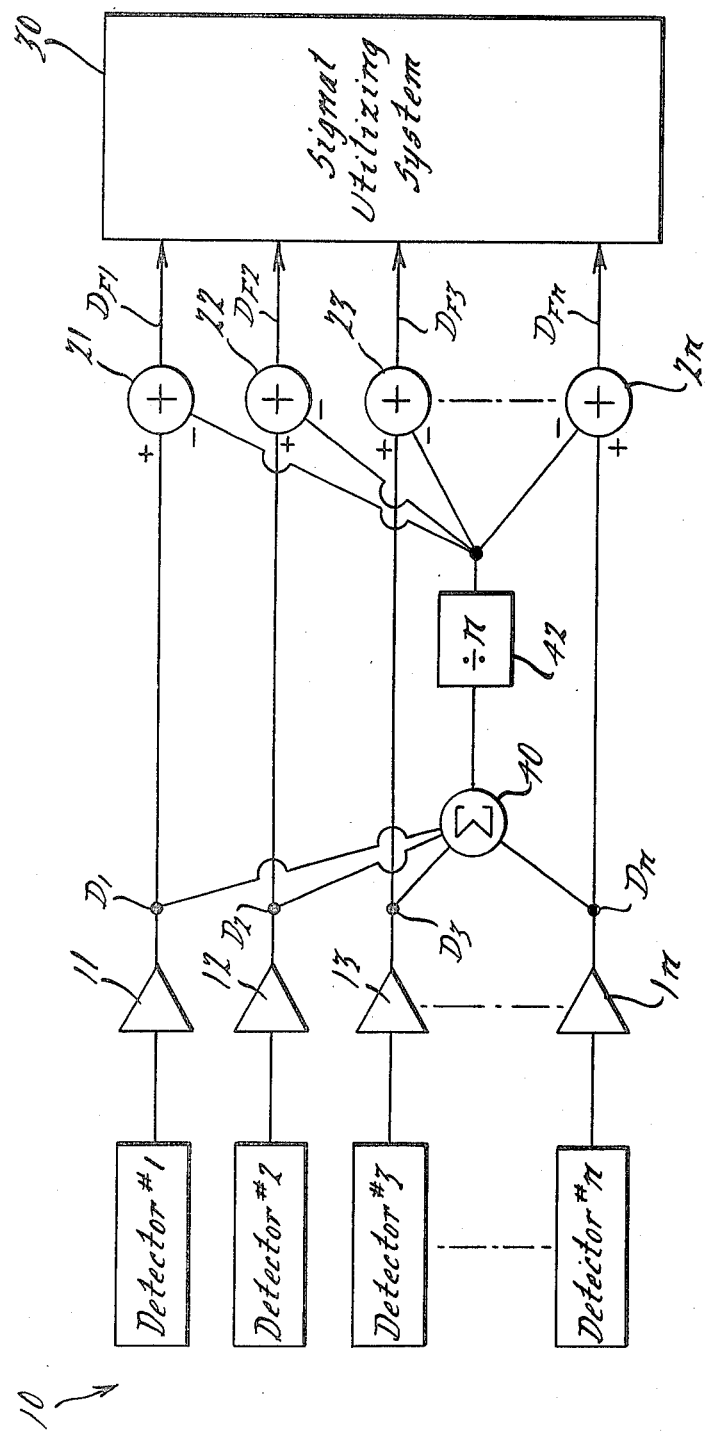

MICROPHONICS ELIMINATION CIRCUIT

BACKGROUND OF THE INVENTION

1. Field of the Invention

The present invention is in the field of electromagnetic radiation detection systems. More specifically, the present invention is directed to an improved signal handling technique for use with pyroelectric detectors, in order to reduce the effects of microphonics on the output signal of each detector.

2. Description of the Prior Art

Infrared radiation detection systems, which employ pyroelectric type detector elements, are generally considered to be quite desirable, since they operate at ambient temperatures and do not require cooling. The avoidance or elimination of associated cooling systems is particularly important in most airborne applications, where weight is critical. However, it is recognized that pyroelectric detector elements are susceptible to undesirable noise effects on detected radiation signals. Due to the fact that pyroelectric detectors are piezoelectric crystals, unwanted strains due to vibrations, as well as thermal changes caused by received radiation, may occur. These strains cause unwanted noise signal components to be output from the detector elements and must be filtered out.

An example of a prior art attempt to eliminate unwanted signal components is shown in U.S. Pat. No. 3,453,432. In that patent, each active (exposed to radiation) pyroelectric detector element is employed in combination with a compensating (shaded from radiation) pyroelectric detector element mounted on a common substrate. The active detector element is oriented to be exposed to incoming radiation while the compensating detector is arranged adjacent the active detector, but shielded so as to not be exposed to incoming radiation. The active and compensating detectors are initially oppositely polarized by the application of opposite voltages. Thereafter, the active and compensating detectors are connected in parallel so that undesirable signals generated, due to substrate temperature changes, are cancelled.

Vibrational noise is sought to be decreased by the invention described in U.S. Pat. No. 4,060,729. In this patent, the ambient noises are recognized as being due to both temperature variations and ambient vibrations. Therefore, employing a technique similar to that described above, two detector elements are mounted in an adjacent configuration so that they are exposed to identical temperature and vibrational variations. In a first embodiment, two elements are initially oppositely polarized and then connected in parallel to effect cancellation of the noise signals created by the temperature variations and vibration. An alternative embodiment is also shown, wherein the two detecting elements are initially polarized the same and the outputs are electrically connected in series opposition, to effect thermal and vibrational noise cancellation.

While the above prior art techniques are suitable for some applications, it has been found that most lightweight, compact, airborne design applications do not allow the luxury of redundant compensation detectors in an array of active pyroelectric detectors. In addition, it has also been found that the above discussed prior art techniques, while reducing noise due to thermal and vibrational variation, produce an increase in random noise signal power. This is due to the fact that uncorrelated random noise is generated independently in each separate pyroelectric detector element. Therefore, when the outputs of two detector elements are subtracted, the random noise power is doubled, rather than cancelled.

SUMMARY OF THE INVENTION

The subject invention is intended to overcome the disadvantages noted in the prior art, while at the same time suppressing the effects of thermal and vibrational noise, as well as reducing the effects of random noise. The invention lies in signal handling circuitry employed at the detector stage of an infrared detection system prior to feeding the detection signals into a signal utilizing system, such as would normally be employed to locate, identify, or otherwise process information contained in the detector output signals generated in response to received infrared radiation.

In an array of "active" pyroelectric detector elements, each element is arranged so as to be exposed to a portion of the field of view. The detector elements are arranged in the array so that they are subjected to common ambient temperature variations and vibrations. The output signal of each detector element is summed with the output signal of all the other detector elements in that array. The summed signal is then averaged and the averaged signal is subtracted from each detector output signal. This technique serves to cancel out the correlated microphonic noise effects caused by vibrational forces in each of the elements as well as by ambient temperature variations, which commonly effect the detector elements. This technique achieves the cancellation of the microphonics with only a slight decrease in the signal to noise ratio characteristics.

It is therefore a purpose of the invention to provide an improved signal handling technique for reducing microphonic effects in pyroelectric detector arrays.

It is another object of the invention to provide circuitry for carrying out the above described technique.

It is a further object of the present invention to increase active element densities in pyroelectric detector arrays while eliminating microphonic effects on the individual output signals from the array.

BRIEF DESCRIPTION OF THE DRAWING

The FIGURE is a schematic of an electronic circuit for carrying out the stated purposes of the invention.

DESCRIPTION OF THE PREFERRED EMBODIMENT

The invention, as summarized above, allows for a high density arrangement of pyroelectric detector elements to be mounted in a compact area and to be operated in a manner that will achieve a cancellation of any microphonics noise components, without the use of complementary (inactive) detector elements.

By referring to the accompanying FIGURE, the invention will be described in detail. The multiple detector elements $\#_1$, $\#_2$, $\#_3$, ..., $\#_n$ of a pyroelectric detector array 10 are shown having output lines which are respectively fed to buffer amplifiers 11, 12, 13, ..., 1n. The unmodified signals $D_1$, $D_2$, $D_3$, ..., $D_n$ from the respective buffer amplifiers 11, 12, 13, ..., 1n are fed to corresponding subtraction circuits 21, 22, 23, ..., 2n. The output of the individual subtraction circuits are then fed to a signal utilization system 30 where they are processed as corrected signals, uncontaminated by microphonics.

Therefore, assuming a detector array 10 employing, for example, 100 detector elements (n=100), wherein one detector, such as "#1", receives a point focus of infrared radiation, the signals output from respective buffer amplifiers are as follows:

| | | |
|---|---|---|
| $D_1$ | = | $S + RN_1 + M$ |
| $D_2$ | = | $RN_2 + M$ |
| $D_3$ | = | $RN_3 + M$ |
| . | . | . |
| . | . | . |
| $D_{100}$ | = | $RN_{100} + M$ |

The above-indicated detector signals each contain a random noise signal "RN", which is uncorrelated from the random noise signals of the other detectors. However, since the detectors are in a common array and are all active, the RMS value $\sigma$ of random noise signals will be approximately equal. Also, the above-indicated signal values each contain a microphonics signal "M", which is correlated with that same signal in each of the detectors, since the array 10 is subjected to common vibrational forces. Of course, $D_1$ indicates, as an example, the true signal "S" which is attributed to the point focused image of the I.R. source.

The detector output signals are combined in summing circuit 40 as:

$$D_1 + D_2 + D_3 \ldots + D_{100}$$

The summed signal is then averaged by the known number of detectors (n=100) in the array at divider 42. The averaged output signal then appears as:

$$[S + RN_1 + (RN_2 + RN_3 + \ldots RN_n) + nM]/n$$

The averaged output signal is then subtracted from each individual detector output signal to achieve a final detector output signal $D_{Fi}$ in which the effects of microphonics are eliminated with only a slight increase in the random noise signal and only a slight reduction in the true signal.

For the exemplified detector $D_1$, the final output signal appears as:

$$D_{F1} = [S + RN_1 + M] - [S + RN_1 + nM + RN_2 + RN_3 + \ldots + RN_n]/n.$$

Correlated microphonics cancel and the expression reduces to:

$$D_{F1} = S(1 - \tfrac{1}{n}) + RN_1(1 - \tfrac{1}{n}) + (RN_2 + RN_3 + \ldots RN_n)/n$$

Since the expression $RN_2 + RN_3 + \ldots + RN_n$ contains $n-1$ terms, this reduces to an RMS value of random noise $$= \sqrt{\sigma^2(1 - 1/n)^2 + \sigma^2(n-1)/n^2}$$

$$= \frac{\sigma}{n}\sqrt{(n-1)(n-1+1)}$$

$$= \frac{\sigma}{n}\sqrt{(n-1)n}$$

$$= \frac{\sigma(n-1)}{n}\sqrt{\frac{n}{n-1}}.$$

Therefore, the true signal component S of the final detector output signal for $D_1$ is reduced by $s/n$ and becomes $$\frac{S(n-1)}{n};$$

e.g., for n=100, S is reduced by 1%. The signal to RMS random noise voltage ratio is also reduced by a factor of $$\sqrt{\frac{n}{n-1}}$$

and becomes $$SNR = \frac{S}{\sigma}\sqrt{\frac{n}{n-1}}.$$

It is therefore clear, by the above description, that although some reduction is made in the true signal component and the signal to noise ratio, the present invention contributes an improvement to the art by providing an elimination of microphonics noise effects in a compact array of active detectors. It is further apparent that many modifications and variations may be made to the invention without departing from the scope fo the novel concept of this invention. Therefore, it is intended by the appended claims to cover all such modifications and variations which fall within the true spirit and scope of the invention.

What is claimed is:

1. In an electromagnetic detection system including an array of "n" commonly mounted pyroelectric detectors, where "n" is a whole number greater than 1 and said pyroelectric detectors are sensitive to electromagnetic radiation to produce respective output signals, and a circuit for reducing signal effects of microphonics generated by said detectors, said circuit comprising:
   means for contemporaneously adding the signal outputs from "n" detectors and producing a summing signal;
   means for averaging said summing signal by a factor of 1/n and generating an average signal;
   means for separately subtracting said averaged signal from each of said signal outputs to cancel correlative signal components and produce corresponding output signals without microphonics.

2. A method of processing signals output from a commonly mounted array of like pyroelectric detectors to eliminate correlative signal components, such as microphonics, including the steps of:
   summing the pyroelectric detector output signals;
   dividing said summed signal by the number of detectors to produce an averaged signal; and
   subtracting the averaged signal for each detector output signal to produce a correspondingly corrected output signal for each detector.

* * * * *